UNITED STATES PATENT OFFICE.

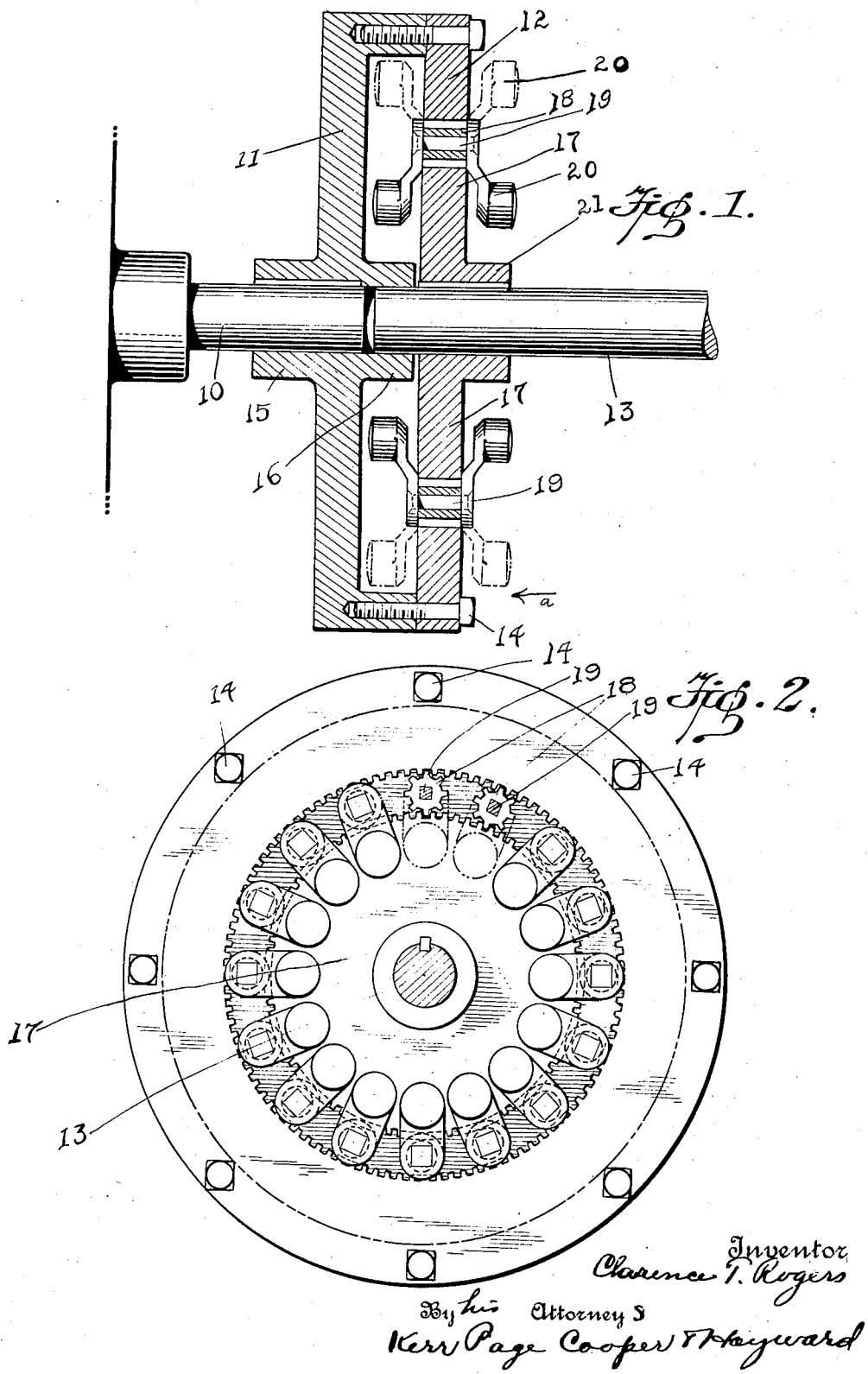

CLARENCE T. ROGERS, OF NEW YORK, N. Y., ASSIGNOR OF ONE-HALF TO ENRIQUE J. CONILL, OF HABANA, CUBA.

TRANSMISSION MECHANISM.

1,277,127.   Specification of Letters Patent.   Patented Aug. 27, 1918.

Application filed January 7, 1916. Serial No. 70,748.

*To all whom it may concern:*

Be it known that I, CLARENCE T. ROGERS, residing at city, county, and State of New York, have invented certain new and useful Improvements in Transmission Mechanism, of which the following is a full, clear, and exact description.

This invention relates to an improved power transmitting device which is so constructed that it will allow slip between the drive and driven shaft when the load on the latter shaft becomes excessive. As an illustration of one of the many uses of my device I will refer to it in connection with an automobile which will clearly elucidate the principal objects of the invention.

In automobiles, when the driving load is excessive, there is a tendency to stall the engine. To prevent stalling the engine, the operator releases the clutch connecting the engine and the shaft driven thereby and allows the engine to regain speed. My improved power transmitting device, when used in an automobile, serves to automatically allow slip to occur when the load becomes excessive. At any speed of the engine the power derived at that speed will be transmitted to the driven shaft to drive the same at a speed proportional to the load put upon the driven shaft. This operation is entirely automatic, requiring no attention whatsoever on the part of the operator.

These and other objects and advantages will more fully appear from the detailed description below, taken in connection with the accompanying drawing, in which—

Figure 1 is a longitudinal section of the device.

Fig. 2 is an end view of the same.

In the drawings, 10 is the driving shaft which may connect in any desired manner with the source of power. Rigidly secured to the driving shaft is a driving member 11, which if desired, may also act as a fly wheel for the engine or source of power. Carried by the driving member 11 is a circular internal toothed member 12 whose axis of rotation coincides with the axis of the driving shaft 10 and also coincides with the axis of the driven shaft 13. This toothed member 12 is secured to the member 11 preferably by means of a plurality of bolts 14.

The member 11 is provided with two bosses 15 and 16 projecting from each side of the center thereof, one of which (15) is employed to make a connection between said member and the driving shaft and the other of which (16) is employed as an anchoring socket for the rear end of the driven shaft 13 coaxially alined with the driving shaft 10. Rigidly secured to the driven shaft 13, as by a spline, is an externally toothed wheel 17 located concentrically to and in the same vertical plane with the internally toothed member 12. The pitch lines of the internally and externally toothed members 12 and 17 are concentric circles whose distance from each other on a radial line from their common center is determined by the use to which the device is put. Between the toothed members 12 and 17 and meshing therewith, are located, preferably at equidistances from each other, a plurality of floating planetary pinions or gears 18 each of which is provided with a fixed shaft 19 and upon one or both ends of these shafts are mounted centrifugal members or weight arms 20 which rotate and revolve in unison with the floating pinions to which they are secured. The toothed member 17 is held against axial displacement with respect to the toothed member 12, and as one means of doing this I suitably shape the arms 20 for that purpose. It will of course be understood that any undue rearward movement of the toothed member may be avoided by its coming into contact with the boss 16.

The operation of the device will now be described, assuming the position of the parts to be as illustrated. If power be applied to the driving shaft 10, the driving member will tend to rotate the toothed member 17, through the pinion connections, in a counterclockwise direction as viewed from Fig. 2. The rotational movement of the driving member and fly wheel will rotate the pinions and weight arms also in a counter-clockwise direction.

Let it be assumed that there is a resistance opposing the turning movement of the driven shaft: this resistance will hold the gear 17 against rotation with the driving member and fly-wheel. Consequently the pinions 18, being enmeshed with the teeth on gear 17 will merely rotate and revolve in a clockwise direction about the circumference of the gear 17, provided of course the resistance is not overcome or is only partially overcome. As the driving member 11 increases in speed more and more centrifugal force will be set up which will tend to throw the weights as far from the center 13 of the shaft as possible. This centrifugal action therefore will oppose the rotation of the weight arms about their respective centers, and, consequently, through the pinions 18, will tend to turn or carry the gear 17 in the direction of rotation of the driving shaft. The velocity of the driven shaft 13 will continue to be less than the velocity of the driving shaft until the centrifugal force set up in the weight arms is sufficient to overcome the load resistance offered by the driven shaft. When these two forces are equal, assuming friction between the parts to be eliminated, the driving and driven shaft will obviously rotate at the same speed. In this state of affairs there is no rotation whatever of the pinions about their own axes; they merely revolve about the axes of the shafts as a center. Consider however that an additional increment of load is applied to the driven member; any increment is sufficient to overcome the resistance offered thereto by the weight arms and consequently the pinions will now rotate about their respective axes at a speed increasing with the increase of load. This permits the driving member to speed up relatively to the driven member under the influence of the motive power applied thereto. This action continues at all times automatically, the driving member always driving the driven member at as high a speed as possible, considering the torque and speed applied to the driving shaft and the torque which is applied to the driven shaft.

From the foregoing it is apparent that the torque at the driven shaft is always equal to the full motor power, the mechanism being so arranged that it automatically varies its speed of transmission to accommodate the increase or decrease of load on the driven shaft. The ratios and construction of the parts are such as to give the required relation of speed between the drive and follower shafts necessary to move any load imposed on the follower shaft up to the full capacity of the motor. It will be quite obvious to any one skilled in the art that the parts may be reversed, that is to say the driving shaft be considered the driven shaft or *e converso*.

It is to be understood that many changes may be made in point of detail and in design and other embodiments resorted to without necessarily deviating from the true spirit and scope of my invention. It will also be understood that the number of uses to which my invention may be put is many, and I therefore do not confine myself to its use in connection with automobiles.

What I claim is:

1. In a power transmitting device, a driven member, a driving member, a gear connected with the driven member, a toothed member connected to the driving member, a plurality of pinions carried by and meshing with the aforesaid gear and toothed member, and a plurality of weight arms rigidly secured to said pinions and adapted through centrifugal action to yieldingly rotate the gear and the driven member connected thereto.

2. In a power transmitting device, a driven member, a driving member, a toothed member connected with the driven member, a toothed member concentric to the aforesaid toothed member and connected with the driving member, pinions meshing with and freely rotatable about the toothed members, arms connected with the pinions, said arms through centrifugal action being adapted to restrain the pinions from rotation, whereby the first mentioned tooth member is driven by the driving member.

3. In a power transmitting device, in combination, a driving member, a driven member, pinions freely rotatable between said members, a toothed member on the driving member and an annular gear on the driven member meshing with the aforesaid pinions, arms connected to said pinions and weights on said arms, said weights and arms being adapted upon the rotation of the driving member to exert a force on the pinions tending to resist rotation, whereby the driven member is yieldingly driven by the driving member.

4. In a power transmitting device, a driven member, a driving member, rotatable devices between said members, means on the members to rotate said devices upon relative rotational movement between said members, and means operated by centrifugal force to resist the rotative movement of the devices on the driving member, whereby the driven member is rotated.

5. In a power transmitting device, in combination, a driven member, a driving member, rotatable devices engaging said members, coöperating means on said members to rotate said devices upon relative rotational movement between the driven and driving member, and centrifugally operated means to restrain the rotation of said devices, the said coöperating means and the rotational devices being then adapted to drive the driven member with an amount of slip with respect to the rotation of the driving member depending upon the speed and torque of the driving member and driven member.

6. In a power transmitting device, a driven member, a driving member and connections for effecting varying relative speeds of said members comprising a gear member fixed to said driven member, a toothed member concentrically arranged about and in substantially the same plane with said gear member, and a plurality of pinions located between and meshing with said gear and toothed members, and centrifugal means connected to said pinions to receive the rotational movement of the driving member whereby the driven member is rotated.

In testimony whereof I hereunto affix my signature.

CLARENCE T. ROGERS.